UNITED STATES PATENT OFFICE.

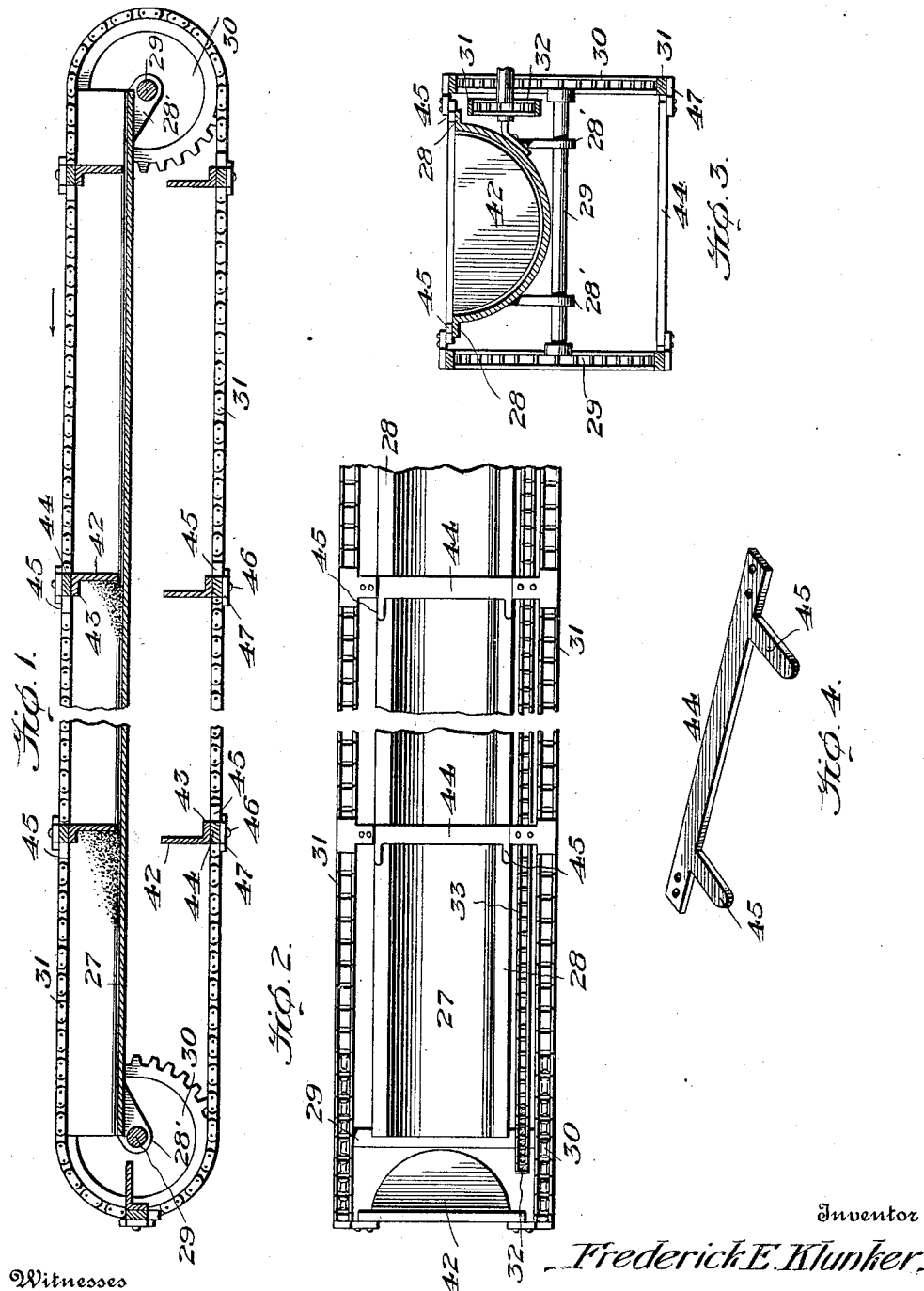

FREDERICK E. KLUNKER, OF CANON CITY, COLORADO.

CONVEYER-FLIGHT.

1,121,511.  Specification of Letters Patent.  Patented Dec. 15, 1914.

Application filed February 16, 1914. Serial No. 818,973.

*To all whom it may concern:*

Be it known that I, FREDERICK E. KLUNKER, a citizen of the United States, residing at Canon City, in the county of Fremont and State of Colorado, have invented certain new and useful Improvements in Conveyer-Flights; and I do declare the following to be a full, clear, and exact description of the invention, such as will enable others skilled in the art to which it appertains to make and use the same.

This invention relates to improvements in conveyers of the endless type, and more especially to the flights employed therein; and the object of the same is to produce an improved form of flight and of connections between the conveyer blade and its actuating chains whereby the former will be caused to stand upright within the trough or at right angles to its line of movement. In the following specification I have illustrated this conveyer as standing horizontal, my purpose being to employ it for carrying concrete from a suitable mixer to the point of delivery, but the means for supporting and driving this conveyer form no part of the present invention as they are illustrated and described in my companion application Number 744,496, filed January 27, 1913.

The details of the invention are set forth in the following specification and claims, and as shown in the drawings, wherein—

Figure 1 is a central longitudinal sectional view of this conveyer complete; Fig. 2 is a plan view of the outer or delivery end thereof; Fig. 3 is a cross sectional view; and Fig. 4 is a perspective detail which will be described hereinafter.

The body of the conveyer in the present instance is illustrated in the form of a semi-circular trough 27, formed preferably of sheet steel and having flat flanges 28 along its edges. Secured to and depending obliquely from and beyond both ends of this trough are metal straps 28' which have bearings for cross shafts 29 carrying sprocket wheels 30 at their extremities, and around these sprockets move two sprocket chains 31. One of said shafts (herein the outermost) carries a sprocket wheel 32 connected by a chain belt 33 with a suitable source of power.

For causing the movement of the material along the trough 27 I mount flights or blades on the chains 31 in the manner best shown in Fig. 3. That is to say, each flight or blade 42 is a semi-circular sheet of metal whose straight edge is bent at right angles to its body into a lip 43, and across the lip is secured a flat metal bar 44 having fingers 45 near its extremities projecting at right angles to its body and adapted to slide along the flat upper faces of the flanges 28 of the trough as best seen in Fig. 3. The ends of this bar 44 are riveted as at 46 to the shanks of T-shaped connecting members 47 whose heads in turn are attached to opposite links in the two chains 31. With this specific construction, it follows that as the chains travel in the direction of the arrow shown in Fig. 1 the fingers 45 precede the bars 44 and slide along the flanges 28 of the trough 27 so that said bars are caused to stand flat, and as the lips 43 at the upper ends of the blades 42 stand at right angles to their bodies, said bodies are caused to stand vertical so that the material within the trough is pushed along as indicated in Fig. 1. By this means I relieve the chains of the burden of holding said blades upright, and that burden is borne by the flat edges of the troughs; and I consider this detail of construction important in a machine of this character, as the burden is considerable when the volume of material is large.

With the machine constructed as above described, its operation is as follows: Assuming that the material to be delivered by this distributer or conveyer is concrete which it is intended to spread over the full width of a street being paved, the concrete is mixed in any suitable manner forming no part of the present invention, and from the mixing machine it is passed through a spout into the trough 27 near the inner end of the latter and therein it is moved positively outward by the blades which travel in the direction of the arrow in Fig. 1. The outer or delivery end of the conveyer may be raised and lowered and swung from side to side by hand or by suitable machinery forming no part of the present invention.

The proportions and materials of parts are not essential to the successful operation of this invention.

What is claimed as new is:

1. An endless carrier comprising a trough having flanges along its upper edges; two endless chains with their upper sides traveling just outside said flanges, a series of blades moving in said trough and each having its upper edge formed into a right-angular lip, a bar secured along said lip and having fingers projecting at right angles from it and overlying said flanges, and connections between said bar and chains.

2. An endless carrier comprising a trough having flanges along its upper edges; shafts journaled at the ends of said trough and carrying sprocket wheels, two endless chains moving over said wheels and with their upper sides traveling just outside said flanges, a series of blades moving in said trough and each having its body shaped to fit the interior thereof and its upper edge formed into a right-angular lip, a bar secured along said lip and having fingers projecting at right angles from it and overlying said flanges, and connectors each riveted upon one extremity of said bar and connected to a link in one of said chains, for the purpose set forth.

3. An endless carrier comprising a trough having flanges along its upper edges, pairs of straps projecting from its ends, shafts journaled in said straps and carrying sprocket wheels at their extremities, and two endless chains moving over said wheels and with their upper sides traveling just outside said flanges; a series of blades moving in said trough and each having its body shaped to fit the interior thereof and its upper edge formed into a right-angular lip, a bar secured along said lip and having fingers projecting at right angles from it and overlying said flanges, and T-shaped connectors each having its shank riveted upon one extremity of said bar and its head connected to a link in one of said chains, for the purpose set forth.

In testimony whereof I have hereunto set my hand in presence of two subscribing witnesses.

FREDERICK E. KLUNKER.

Witnesses:
H. C. SMITH,
W. C. BLOYED.

Copies of this patent may be obtained for five cents each, by addressing the "Commissioner of Patents, Washington, D. C."